United States Patent [19]

Nakagaki

[11] Patent Number: 5,129,810
[45] Date of Patent: Jul. 14, 1992

[54] MOLD EJECTING APPARATUS FOR CYLINDRICAL MOLDING

[75] Inventor: Toshio Nakagaki, Kobe, Japan

[73] Assignee: Bando Kagaku Kabushiki Kaisha, Kobe, Japan

[21] Appl. No.: 610,702

[22] Filed: Nov. 8, 1990

[30] Foreign Application Priority Data

Nov. 21, 1989 [JP] Japan .................. 1-304350

[51] Int. Cl.⁵ .............. B29C 33/46; B29C 43/50; B29C 45/42
[52] U.S. Cl. ................... 425/422; 249/63; 249/68; 264/334; 264/335; 425/437; 425/441; 425/577
[58] Field of Search ............... 425/437, 441, 443, 454, 425/577, 566, 422, 436 RM, 436, 403, 438; 249/67, 68, 63; 264/334, 335, 336

[56] References Cited

U.S. PATENT DOCUMENTS

| | | | |
|---|---|---|---|
| 2,929,105 | 3/1960 | Starck et al. | 425/435 |
| 4,364,895 | 12/1982 | Underwood | 425/437 |
| 4,375,948 | 3/1983 | Von Holdt | 425/437 |
| 4,560,339 | 12/1985 | Padovani | 425/437 |
| 4,571,320 | 2/1986 | Walker | 264/335 |
| 4,653,997 | 3/1987 | Sheffield et al. | 425/437 |
| 4,660,801 | 4/1987 | Schad | 425/437 |
| 4,674,972 | 6/1987 | Wagner | 425/422 |
| 4,935,187 | 6/1990 | Vente et al. | 425/435 |
| 5,020,986 | 6/1991 | Reil | 425/437 |

*Primary Examiner*—Jay H. Woo
*Assistant Examiner*—Khanh P. Nguyen
*Attorney, Agent, or Firm*—Marshall, O'Toole, Gerstein, Murray & Bicknell

[57] ABSTRACT

This disclosure relates to a mold ejecting apparatus for ejecting an inner mold from a cylindrical molding, e.g. a cylindrical rubber molding, sticking to the outer circumference of the inner mold, or for ejecting the cylindrical rubber molding from the inner mold. A plurality of small holes are formed through the circumferential wall of the inner mold, and a pressurized fluid feed line is connected to an opening in one end face of the inner mold to introduce a pressurized fluid into the hollow interior of the inner mold. A plurality of matching members are movable to contact or come close to the outer circumference of the inner mold and match with an end face of the molding, the matching members being movable towards and away from the outer circumference of the inner mold. A pressing apparatus is provided for moving the molding relative to the matching members and the inner mold and separating them.

6 Claims, 4 Drawing Sheets

MOLD EJECTING APPARATUS FOR CYLINDRICAL MOLDING

FIELD AND BACKGROUND OF THE INVENTION

The present invention relates to apparatus for separating an inner mold from a cylindrical molding, e.g. a cylindrical rubber molding, which sticks to the outer circumference of the inner mold.

In the production process of rubber belts, for example, a cylindrical unvulcanized belt material is wound over an inner mold and is vulcanized in a vulcanizer. After vulcanization, the inner mold to which the vulcanized cylindrical rubber molding (called a slab) adheres is ejected by a mold ejecting apparatus to recover the rubber molding. The conventional mold ejecting apparatus has the construction illustrated in FIG. 6, and includes a mold ejecting ring body 61 having a bore corresponding to the outer diameter of an inner mold 62 which is placed directly above a central opening 64 of a frame base 63. The bottom end face of the cylindrical rubber molding A which is formed on and sticks to the outer circumference of the inner mold 62 is matched with the ring body 61 so as to place the cylindrical rubber molding A, together with the inner mold 62, on the ring body 61. Directly above the center of the ring body 61, a piston rod 66 of a hydraulic cylinder unit 65 is arranged to be moved downwardly. The piston rod 66 is arranged to push the inner mold 62 downwardly relative to the cylindrical rubber molding A and eject the inner molding 62 from the molding A.

Although not illustrated, there are also reverse arrangements wherein the inner mold is fixed in the specified position on the frame base, and a ring body matched with the upper end face of a cylindrical rubber molding is pushed down by a piston rod of a hydraulic cylinder unit to eject the inner mold. In both cases, the conventional mold ejecting apparatus uses a fixed-form ring body 61 matched to the size of the inner mold 62 to eject the inner mold 62 from the molding A.

In the above-mentioned conventional mold ejecting apparatus, when the size of the inner mold is changed, the ring body must also be replaced with one that matches the size of the inner mold, and the replacement is normally made by operators who select an appropriate ring body from many ring bodies. As the exchange of ring bodies takes much time, the work efficiency is low. Furthermore, since the inner mold is ejected when the inner circumference of the cylindrical rubber molding is in close contact with the outer circumference of the inner mold it is necessary to apply a very large pressing force (ejecting force) of the piston rod of the cylinder unit against the inner mold or the ring body. Hence the ring body tends to break, and the inner mold may be damaged if the inner mold is not set properly. The cylindrical rubber molding may be damaged or deformed by similar causes.

SUMMARY OF THE INVENTION

The present invention was made in the light of the aforementioned points, and is intended to provide a mold ejecting apparatus that is capable of automatically adjusting itself in size to match with inner molds of various sizes to eject the inner mold, has a high work efficiency, has a smaller ejecting force in comparison with the conventional apparatus, and has no risk of damaging the inner mold or the cylindrical molding.

To accomplish the aforementioned objective, the mold ejecting apparatus according to the present invention is characterized in that a) the circumferential wall of the inner mold is provided with a plurality of small through holes, b) a pressurized fluid feed line is connected to an opening made in one end of the inner mold to introduce a pressurized fluid into the hollow interior of the inner mold, c) a plurality of matching members, which are capable of contacting or coming close to the outer circumference of the inner mold and matching with one end face of said molding, are arranged so that the matching members are able to move towards and away from the outer circumference of the inner mold, d) a pressing apparatus is provided for moving the mold or the molding relative to each other in order to separate them.

In the operation of the mold ejecting apparatus having the aforementioned construction according to the present invention, the plurality of matching members are moved forward to contact or come close to the outer circumference of the inner mold and also to match or become matchable with one end face of the cylindrical molding sticking to the outer circumference of the inner mold. Hence the aforementioned respective matching members will contact or come close to the outer circumference of the inner mold thereby responding to various sizes of the inner mold. Under this condition, pressurized fluid such as air is introduced from the pressurized fluid feed line connected to the opening of the inner mold into the hollow interior of the inner mold. Then the pressure inside the hollow will rise gradually, and when it overcomes the sticking force of the molding, the pressurized air contained inside the hollow will blow out of the plurality of small holes in the circumferential wall. As a result, an air layer is formed between the outer circumference of the inner mold and the inner circumference of the cylindrical molding, separating the cylindrical molding from the inner mold. This will reduce the ejecting force required to eject the inner mold from the cylindrical molding. After that, the inner mold or the matching members is pressed by the pressing apparatus to separate the mold and the molding. In this way the inner mold is ejected from the cylindrical molding. As a result, the force (mold ejecting force) acting on the inner mold and the cylindrical molding is reduced relative to that of the conventional apparatus and the mold or the molding will not be damaged.

DETAILED DESCRIPTION OF THE DRAWINGS

Figure 1:
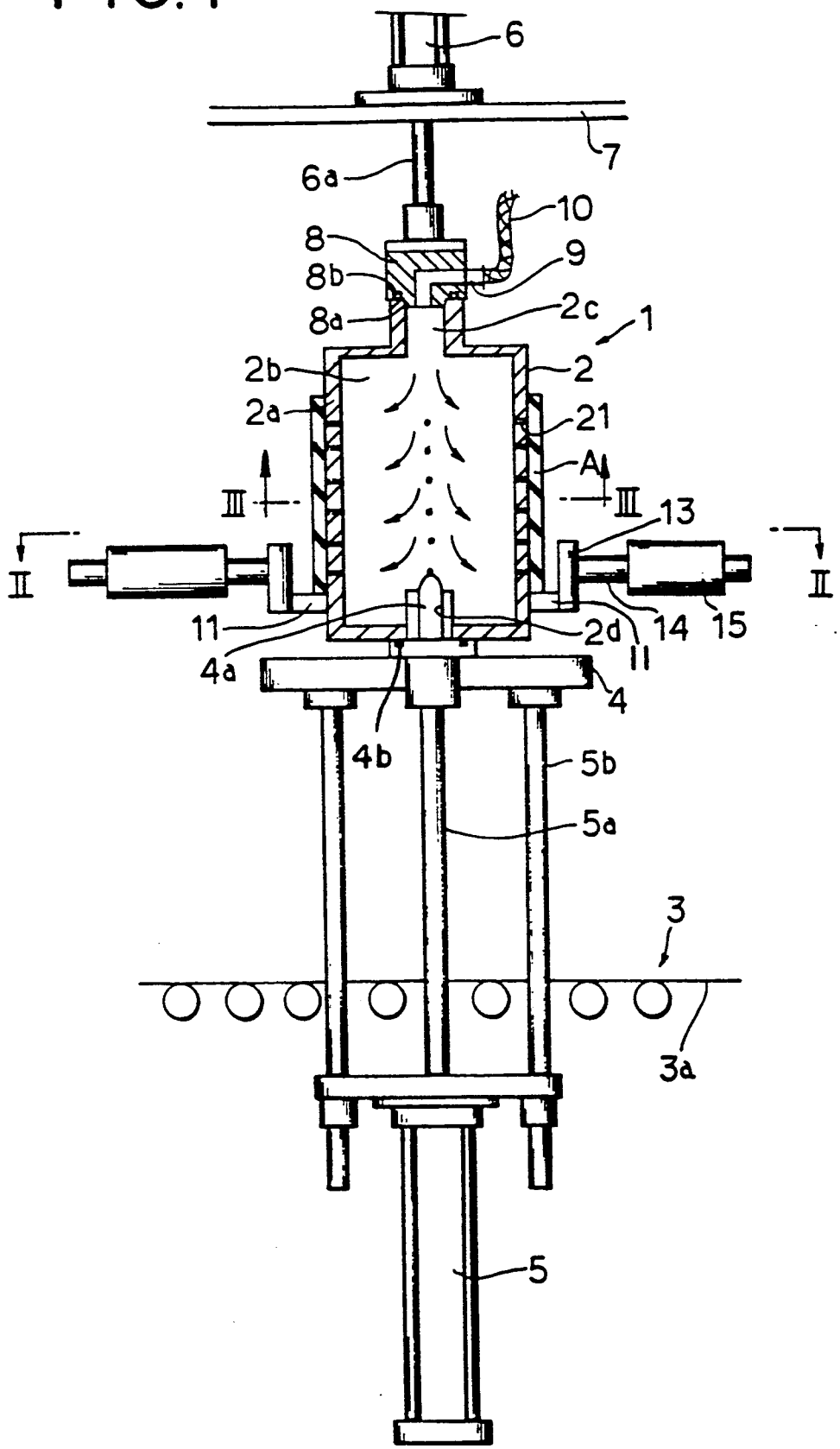
FIG. 1 is a front view partially in section showing an embodiment of the mold ejecting apparatus according to the present invention.
Figure 2:
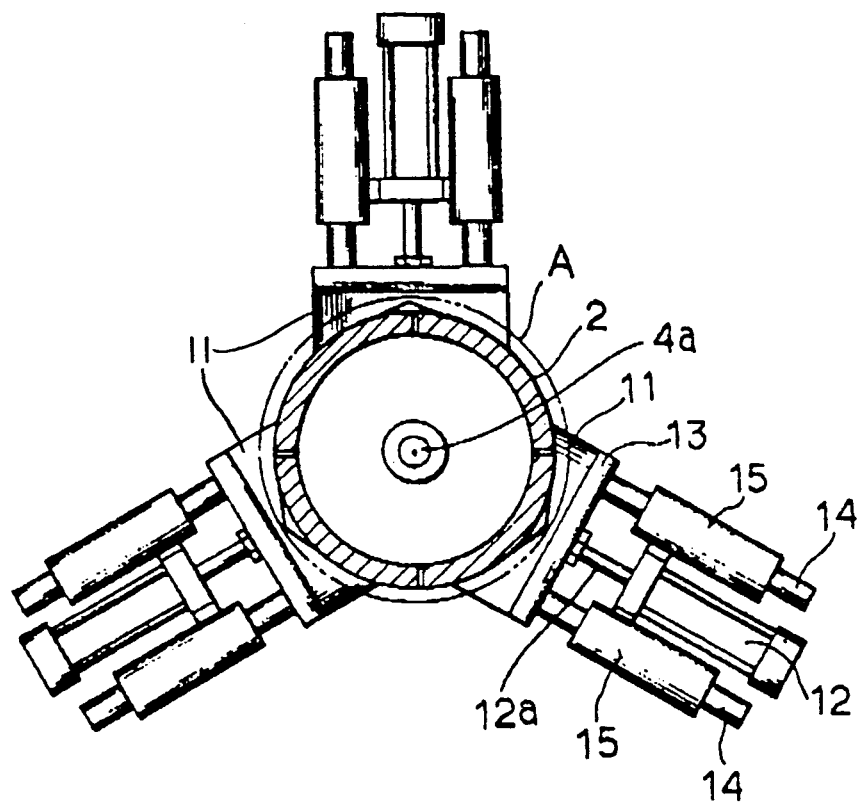
FIG. 2 is a view partially in section along the line II—II of FIG. 1.
Figure 3:
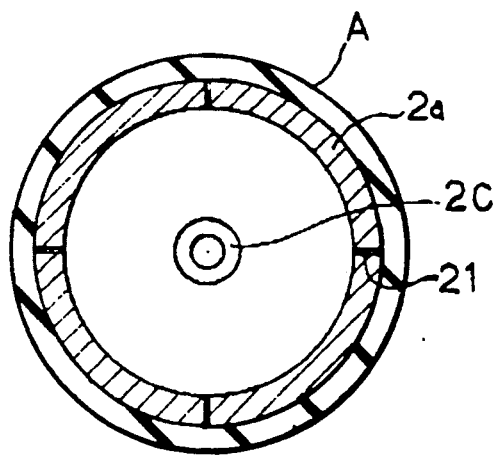
FIG. 3 is a sectional view along the line III—III of FIG. 1.

The mold ejecting apparatus 1 shown in FIGS. 1 to 3 ejects an inner mold 2 to which a cylindrical rubber molding A adheres after vulcanization of the rubber molding A which is, for example, a belt material prior to being cut crosswise into the final belt width products.

The inner mold 2 has, as illustrated in FIG. 1 and FIG. 3, a hollow interior 2b, and its cylindrical circumferential wall 2a is provided with a plurality (twentyfour holes in the present embodiment) of small through holes 21 (for instance, around 1 mm in diameter) at regular intervals. Both end faces of the inner mold 2 are provided at their centers with openings 2c and 2d for introducing high temperature steam into the hollow interior 2b during the preceding vulcanization process (not shown).

As illustrated in FIG. 1, a belt conveyor system 3 is arranged horizontally to transport vulcanized rubber moldings A together with their inner molds 2. This belt conveyor system 3 has a construction wherein a pair of laterally spaced conveyor belts 3a are arranged in parallel with each other with a certain interval or space between them. Beneath the belt conveyor system 3, a hydraulic cylinder unit 5 is arranged with the piston rod 5a extending upwardly between the two belts. A support plate 4 for the inner mold 2 is fixed t the top end of the piston rod 5a through a plurality of guide rods 5b. The support plate 4 is rectangular, is capable of moving through the space between the two belt conveyors 3a, and is moved vertically by a cylinder unit 5. The top of the support plate 4 is provided at the center with a protruding plug 4a which is inserted into the bottom end opening 2d of the inner mold 2 to thereby block the opening 2d. 4B is a packing ring which forms a seal.

Another hydraulic cylinder unit 6 is arranged above the belt conveyor system 3 in opposition to the hydraulic cylinder unit 5. The cylinder unit 6 is supported by a top plate 7, and its piston rod 6a protrudes downwardly through a hole in the top plate 7. A covering member 8 which closely contacts the upper end of opening 2c of the inner mold 2 to cover or block the opening 2c is connected to the outer end of the piston rod 6a. The covering member 8 is provided with a feed pipe 9 for a pressurized fluid (pressurized air in this specific example) from one side face to the bottom end face, and one end of the feed pipe 9 is connected to one end of a flexible hose 10. The lower end 8a of the covering member 8 is formed into a tapered cone to effect centering of the inner mold 2 in cooperation with the protruding plug 4a. 8b is an O-ring. The other end of the flexible hose 10 is connected to a pressurized air source (not illustrated).

Figure 4:
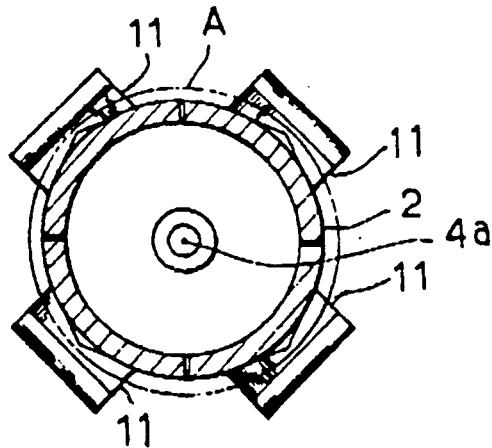
FIG. 4 is a sectional view similar to FIG. 2 but showing an alternative embodiment having a different number of matching claws.

As shown in FIG. 1 and FIG. 2, a plurality (three in the present embodiment) of angularly spaced matching claws 11, which are movable into contact with, or close to, the outer circumference at the lower end of the inner mold 2 and are shaped to match with the adjacent lower end face of the cylindrical rubber molding A, are arranged substantially halfway between the upper and lower cylinder units 5, 6, around the inner mold 2. The respective matching claws 11 are mounted, as illustrated in FIG. 2, on the outer ends of the piston rods 12a of the hydraulic cylinder units 12, radially arranged at equal angular intervals around the inner mold 2, via supporting plates 13. The matching claws 11 are shaped to assure close contact with the outer circumference of the inner mold 2 irrespective of the mold size, such as by providing a V-shape as seen from above (FIG. 2), arc, etc. One end of each of a pair of parallel guide rods 14 is fixed to the support plate 13 on both sides of the piston rod 12a, and the respective guide rods 14 are movably passed through the guide sleeves 15 fixed to the cylinder unit 12 on both sides thereof. The number of the matching claws 11 may be any number provided it is not less than 2. For example, it may be four as shown in FIG. 4. The material of the matching claws 11 is not specially limited. However, it is desirable to use synthetic resins such as nylon resin to prevent damage to the inner mold 2 which is made of metal.

With regard to the operation of the mold ejecting apparatus 1, reference is made to FIG. 1. First, the cylindrical rubber molding A is taken out of a vulcanizer (not illustrated) and cooled, and while still sticking to the outer circumference of an inner mold 2, it is carried by a belt conveyor system 3 to the position of a mold ejecting apparatus 1. Second, the bottom face of the inner mold 2 riding across a pair of conveyor belts 3a is engaged and supported from below by a support plate 4 which is raised up by the hydraulic cylinder unit 5, and the top face of the inner mold 2 is supported from above by the covering member 8 which is lowered by the hydraulic cylinder unit 6; thus the inner mold 2 is held between the support plate 4 and the covering member 8. In this condition, a lower end opening 2d of the inner mold 2 is blocked by a protruding plug 4a which closely contacts the lower end opening 2d, and the upper end opening 2c is blocked by the covering member 8 which closely contacts the upper end opening 2c. At the same time, the inner mold 2 is centered by the protruding plug 4a and the covering member 8 and the central axis of the inner mold 2 is aligned with the central axis of the mold ejecting apparatus 1. Third, the upper and lower hydraulic cylinder units 5, 6 are operated in an interlocking manner to lift the inner mold 2 from the belt conveyor system 3, and the operation of the hydraulic cylinder units 5, 6 is terminated when the lower end face of the cylindrical rubber molding A sticking to the outer circumference of the inner mold 2 is a little higher than the matching claws 11. The respective matching claws 11 previously have been retracted to a withdrawn position wherein the claws 11 do not interfere with the inner mold 2 and the cylindrical rubber molding A when they pass through the space surrounded by the respective matching claws 11. Fourth, the piston rods 12a of the respective hydraulic cylinder units 12 (FIG. 2) are extended simultaneously to advance the respective matching claws 11, and the matching claws 11 contact or come close to the outer circumference the inner mold 2 below the lower end of the molding A. Fifth, pressurized air is introduced from the pressurized air feed pipe 9 into the hollow interior 2b of the inner mold 2, and when the pressure inside the hollow 2b becomes greater than the sticking force of the cylindrical rubber molding A sticking to the outer circumference of the inner mold 2, pressurized air will start to blow out of the small holes 21 in the circumferential wall 2a, giving a whistling sound. In this condition, an air layer is formed between the inner circumference of the cylindrical rubber molding A and the outer circumference of the inner mold 2, and the cylindrical rubber molding A becomes separated from the outer circumference of the inner mold 2. Sixth, now the upper and lower hydraulic cylinder units 5 and 6 are synchronized with each other and slowly lower the mold 2. Preferably the mold is inched downwardly by short movements and pauses. The inner mold 2 will gradually descend relative to the cylindrical rubber molding A which is held in the specified position by the plurality of claws 11 which match the lower end face of the molding A; thus the inner mold 2 is ejected from the molding A. Seventh, after that, the upper and lower cylinder units 5, 6 are lowered further to place the inner mold 2 on the belt conveyor system 3. The molding initially rests on the claws 11, and the matching claws 11 are retracted to release the molding A; the upper cylinder unit 6 is raised to withdraw it from the cylindrical rubber molding A which drops to the conveyor 3. The inner mold 2 is conveyed together with the rubber molding A to a specified place by the belt conveyor system 3 for further processing.

In the case of the aforementioned embodiment, to eject the inner mold 2 by pressing it downwardly, the hydraulic cylinder units 5, 6 are provided beneath and above the inner mold 2. Instead of two hydraulic cylinder units as described above, the hydraulic cylinder unit 6 may be used on the upper side, and a pneumatic cylinder unit may be used on the lower side in place of the hydraulic cylinder 5. In this case, to eject the mold, only the hydraulic cylinder unit 6 is actuated to slowly lower it. The air of the lower pneumatic cylinder unit will be compressed to allow the pneumatic cylinder unit to lower to some extent. Further, in place of cylinder units 5, 6, motor-operated feed screw mechanisms may be used as will be described below. Moreover, in the aforementioned embodiment, in addition to the cylinder unit 6 for ejecting the inner mold 2, the cylinder unit 5 is provided to lift and support the inner mold 2 and block the lower end opening 2d of the inner mold 2. However, the cylinder unit 5 may be eliminated by blocking the lower end opening 2d of the inner mold 2 by other means and lifting the inner mold 2 using the cylinder unit 6. Furthermore, damage to the outer circumference of the inner mold 2 can be prevented safely, even without using nylon resin or the like for the matching claws 11, by controlling the forward movement of the matching claws 11 in such a way that the forward movement of the matching claws 11 is terminated when the claws 11 come to a position where the claws 11 match with the lower end face of the cylindrical rubber molding A but do not contact the outer circumference of the inner mold 2.

Figure 5:
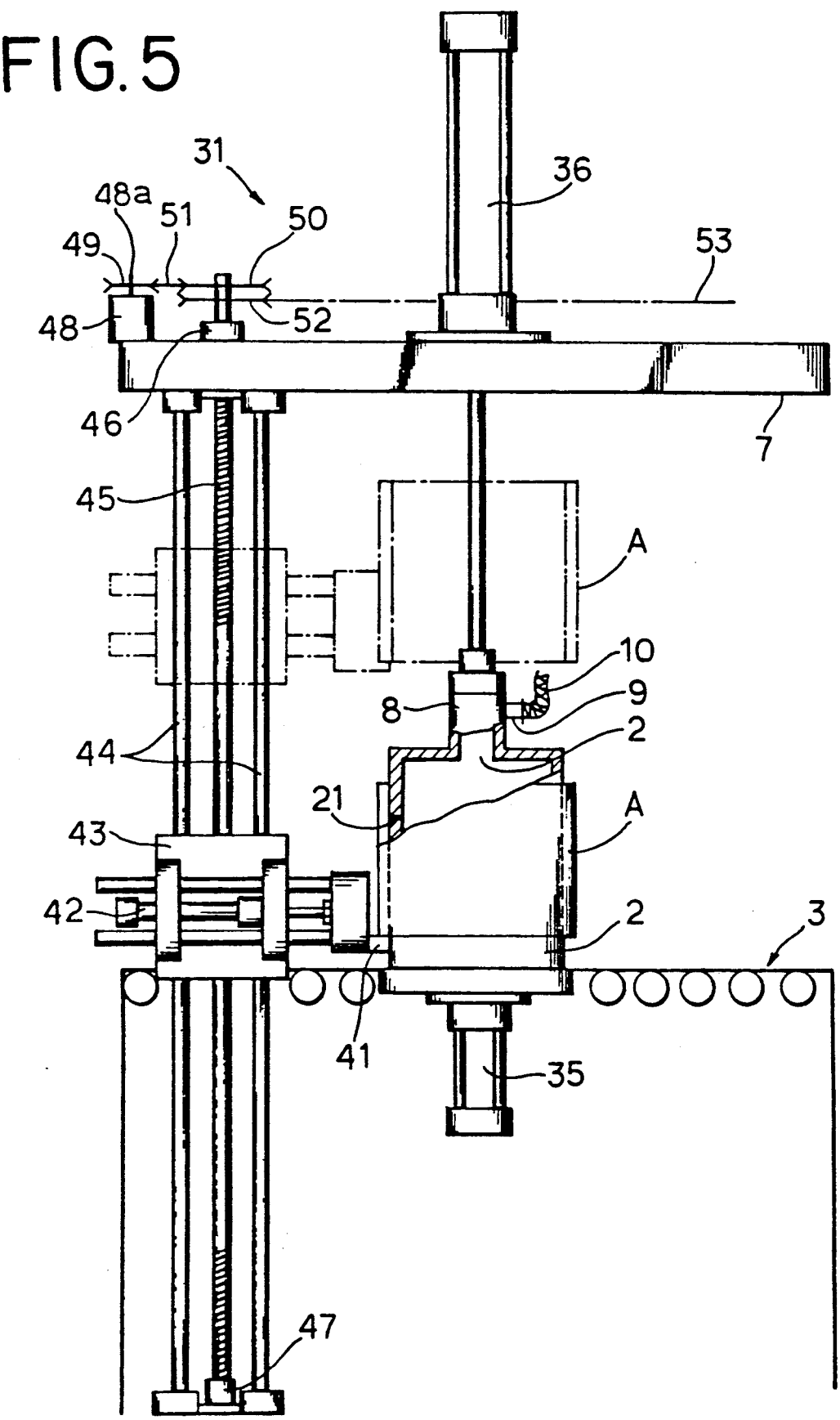
FIG. 5 is a front view showing another embodiment of the mold ejecting apparatus according to the invention.
Figure 6:
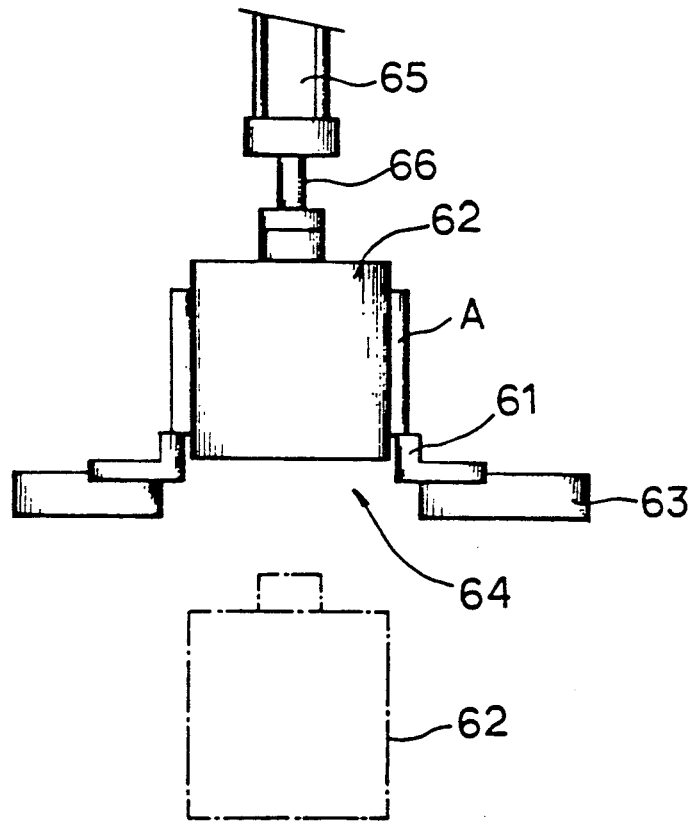
FIG. 6 is a front view showing a conventional mold ejecting apparatus.

FIG. 5 shows an embodiment of the mold ejecting apparatus according to a second embodiment of the invention. The major differences between the mold ejecting apparatus 31 of FIG. 5 and the mold ejecting apparatus 1 of FIG. 1 are as follows: As shown in FIG. 5, hydraulic cylinder units 35, 36 corresponding to the upper and lower cylinder units 5, 6 are arranged beneath and above an inner mold 2. The cylinder units 35, 36 are designed to function as fixing means for holding the inner mold 2 in the specified position, and unlike the cylinder units 5, 6, do not function to move and eject the inner mold 2. Instead, the cylinders 35, 36 are arranged to eject the cylindrical rubber molding A from the inner mold 2 by simultaneously moving a plurality of matching claws 41, corresponding to the matching claws 11, from the lower end of the inner mold 2 towards the upper end thereof, pressing the cylindrical rubber molding A with which the matching claws 41 match and intermittently raising the molding A. This mold ejecting apparatus 31 has the basic feature common to the mold ejecting apparatus 1 that when the cylindrical rubber molding A is to be ejected, pressurized air is introduced into the hollow interior 2b of the inner mold 2 to blow pressurized air out of the small holes 21 in the circumferential wall 2a.

In more detail, as shown in FIG. 5, the plurality of matching claws 41 are circumferentially arranged at regular intervals around the inner mold 2 which is held in the specified position by the upper and lower cylinder units 35, 36. The respective matching claws 41 are moved towards and away from the inner mold 2 by cylinder units 42 corresponding to the cylinder units 12. The cylinder units 42 including the matching claws 41 are mounted on support brackets 43. Each support bracket 43 is arranged in such a way that the support bracket 43 can be slid vertically along a pair of guide rods 44 arranged in parallel with the cylinder units 35, 36. A feed screw rod 45 has threads thereon throughout substantially its entire length, and it is rotatably supported by upper and lower bearings 46, 47 between the pair of guide rods 44. The feed screw rod 45 is threaded through a threaded hole not illustrated) formed through the support bracket 43, and the support bracket 43 is arranged to be raised or lowered by the rotation of the feed screw rod 45. A drive motor 48 is installed on one end of a top plate 7 of the machine frame, and a sprocket 49 fixed to the drive shaft 48a of this driving motor 48. A sprocket 50 fixed to the top end of the feed screw rod 45, the top end protruding above the top plate 7, and the sprockets 49, 50 are connected by a chain 51. A sprocket 52 is fixed to the feed screw rod 45 immediately beneath the sprocket 50, and the sprockets (not illustrated) of the other feed screw rods (not illustrated) are connected by an interlocking chain 53. As a result, when the feed screw rod 45 is turned in a specific direction by the drive motor 48, the other feed screw rods (not illustrated), one being provided for each claw, will be turned simultaneously in the same direction by the interlocking chain 53. This raises the respective matching claws 41 together with their support brackets 43 to push up the end face of the cylindrical rubber molding A on the inner mold 2 which matches with the matching claws 41, and thereby ejects the rubber molding A from the inner mold 2. During mold ejection, the drive motor 48 is stopped and restarted after every specified number of rotations to inch the matching claws 41 upwardly and push up the rubber molding A. Thus like the mold ejecting operation of the cylinder unit 6, the mold ejecting is effected smoothly. Members common to those of the mold ejecting apparatus 1 are indicated in FIG. 5 by the same symbols used in FIG. 1, and their explanation is omitted.

In the aforementioned embodiments of the mold ejecting apparatus, explanation is given to cases including an inner mold 2 to which a rubber molding A adheres. The use of the apparatus is not limited to rubber moldings A. For example, the apparatus is applicable to urethane resin moldings in a similar manner.

As will be clear from the explanation above, the present invention has the following advantages or effects:

Since the apparatus is arranged to eject the inner mold by matching a plurality of members, movable towards and away from the inner mold, with an end face of the cylindrical molding, the apparatus is capable of ejecting inner molds of various sizes by automatically adjusting its size to the given inner mold. Unlike the conventional apparatus, with the present apparatus, it is not required to replace the ring body whenever the size of the inner mold is changed. Hence the workload of the operators is less, and the work efficiency is higher. Moreover, automation of the whole apparatus can be made easily.

Because mold ejection is effected only after the state of sticking of the cylindrical molding to the mold is eliminated by blowing a pressurized fluid out from between the outer circumference of the inner mold and the inner circumference of the cylindrical molding sticking to the mold, the mold ejecting force is reduced significantly relative to that of the conventional apparatus. As a result, mold ejection is reliably effected by using the aforementioned plurality of matching members in place of the conventional ring body, and there is no risk of damaging the inner mold or the cylindrical molding. The holes in the inner mold should be small enough that the molding is not severely deformed by extending into the holes during the molding operation.

What is claimed is:

1. A mold ejecting apparatus for removing a cylindrical molding from the outer circumference of an inner mold, said apparatus comprising
    a hollow inner mold formed by a circumferential wall and end plates, a plurality of small open holes being formed through said circumferential wall of said inner mold,
    a pressurized fluid feed line connected to an opening formed in one end plate of said inner mold for introducing a pressurized fluid into the hollow interior of said inner mold and through said open holes and into a space between said circumferential wall and said molding,
    a plurality of matching members which are adapted to contact or come close to said circumferential wall of said inner mold and match with one end face of said molding, means for moving said matching members radially towards and away from said circumferential wall of the inner mold, and
    a pressing device operable to engage one of said end plates of said inner mold and to move said mold relative to said matching members and said molding.

2. A mold ejecting apparatus as set forth in claim 1, wherein said matching members have shapes which match said circumferential wall.

3. A mold ejecting apparatus ejecting a cylindrical molding sticking to the outer circumference of a hollow inner mold, comprising:
    a hollow inner mold formed by a circumferential wall and end plates,
    a fixing means for holding said inner mold in a specified position,
    a plurality of small open holes through said circumferential wall of said inner mold,
    a pressurized fluid feed line connected to an opening in one of said end plates of the inner mold for introducing a pressurized fluid into the hollow interior of said inner mold and through said open holes and into a space between said circumferential wall and said molding,
    a plurality of matching members and means for moving said matching members radially to contact or come close to said circumferential wall of the inner mold and arranged so that said matching members are movable towards and away from the outer circumference of the inner mold, and
    a pressing device which moves said matching members from one end plate of the inner mold towards the other end plate thereof and arranged to move said molding in the axial direction relative to said inner mold.

4. A mold ejecting apparatus for removing a cylindrical molding from a mold, comprising
    a) a mold formed by a cylindrical outer wall and end plates at the ends thereof, said mold having a hollow interior, a cylindrical molding being adapted to be formed on said outer wall;
    b) a plurality of small open holes in said outer wall;
    c) means for introducing a pressurized fluid into said hollow interior and through said open holes to a space between said outer wall and said molding;
    d) matching means for engaging said molding; means for moving said matching means radially towards and away from said cylindrical outer wall; and
    e) pressing means for moving said mold relative to said molding and said matching means.

5. Apparatus as set forth in claim 4, wherein said pressing means engages and moves said mold.

6. Apparatus as set forth in claim 4, wherein said pressing means engages and moves said matching means.

* * * * *